United States Patent
Bradfield et al.

(10) Patent No.: US 7,345,391 B2
(45) Date of Patent: Mar. 18, 2008

(54) METHOD AND APPARATUS FOR ATTACHMENT OF A COVER FOR A DYNAMOELECTRIC MACHINE

(75) Inventors: Michael D. Bradfield, Anderson, IN (US); Michael A. McCord, Anderson, IN (US)

(73) Assignee: Remy International, Inc., Anderson, IN (US)

( * ) Notice: Subject to any disclaimer, the term of this patent is extended or adjusted under 35 U.S.C. 154(b) by 356 days.

(21) Appl. No.: 11/056,875

(22) Filed: Feb. 11, 2005

(65) Prior Publication Data

US 2006/0181167 A1    Aug. 17, 2006

(51) Int. Cl.
*H02K 5/00* (2006.01)
(52) U.S. Cl. ...................... 310/89; 310/68 R
(58) Field of Classification Search ............ 310/89–91, 310/68 R, 254
See application file for complete search history.

(56) References Cited

U.S. PATENT DOCUMENTS

| | | | | |
|---|---|---|---|---|
| 5,245,237 A | * | 9/1993 | Fisher et al. | 310/89 |
| 5,315,195 A | | 5/1994 | Bradfield et al. | 310/89 |
| 6,150,741 A | * | 11/2000 | Hayashi et al. | 310/68 D |
| 6,657,338 B2 | * | 12/2003 | Fisher et al. | 310/89 |
| 6,774,518 B2 | * | 8/2004 | Howe et al. | 310/89 |
| 6,831,382 B1 | * | 12/2004 | Lyle et al. | 310/89 |

* cited by examiner

*Primary Examiner*—Thanh Lam
(74) *Attorney, Agent, or Firm*—Cantor Colburn LLP

(57) ABSTRACT

A cover assembly for one end of a rotating electrical machine includes a one-piece cover formed of plastic material attached to an end frame supporting at least one electrical component to protect said electrical component from external damage, the cover has an end wall and an axially extending side wall, the side wall has an end surface that engages the end frame; a mounting boss is disposed at the end frame; and a single fastener extends through the end surface. A clamp load at the single fastener securely holds the cover relative to the end frame.

10 Claims, 3 Drawing Sheets

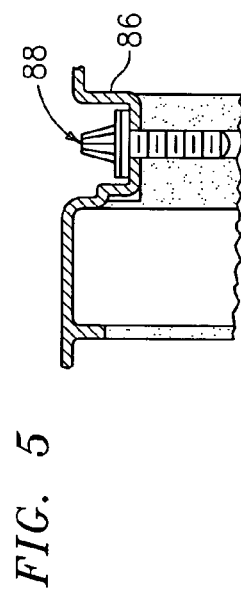
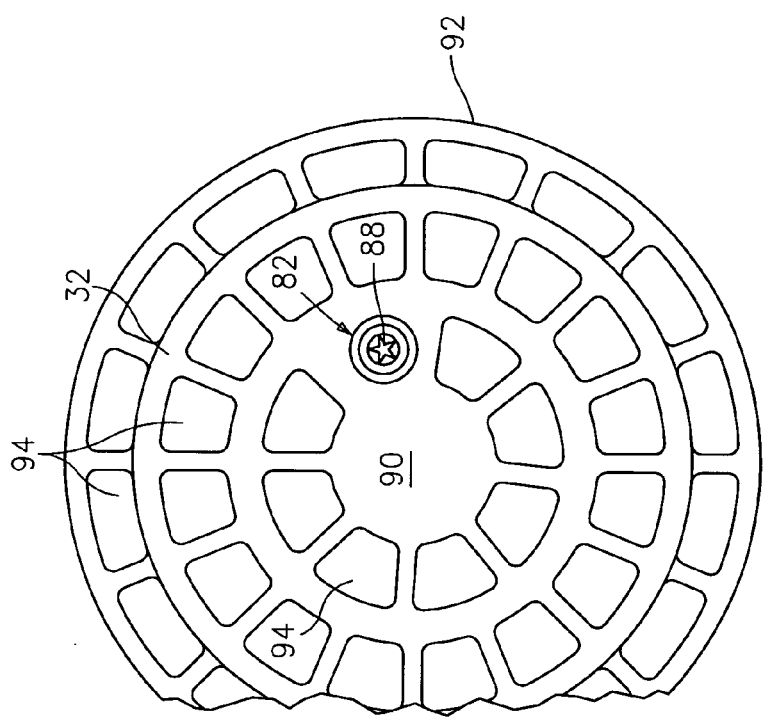
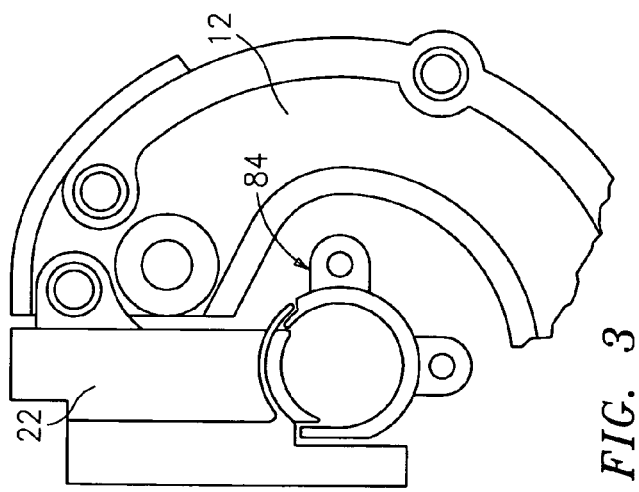
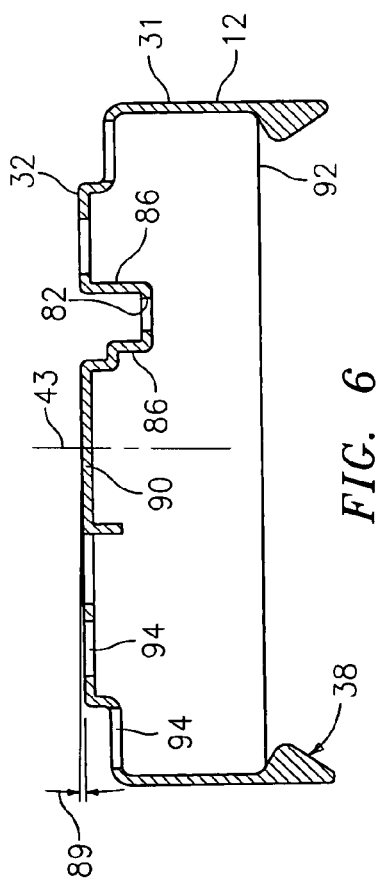

US 7,345,391 B2

METHOD AND APPARATUS FOR ATTACHMENT OF A COVER FOR A DYNAMOELECTRIC MACHINE

TECHNICAL FIELD

This application relates generally to a cover for dynamoelectric machines such as alternating current generators and, more particularly, to a cover that is attached to an end frame of a dynamoelectric machine with a single fastener to provide protection from external damage for electrical components mounted on the end frame.

BACKGROUND

Rotating electrical machines such as vehicle alternators (dynamoelectric machines) (also commonly referred to as "generators") having a stator secured within the housing of the machine and a rotor assembly that extends axially through the motor or generator are well known. The housing often includes two or more spaced apart frames which provide the main structural elements of the alternator. The frame closest to a pulley, which powers the alternator via a belt drive is commonly referred to as the drive end frame. The opposite frame is commonly referred to as the slip ring end frame. The frames support the rotor assembly comprising a rotor shaft with or without a connected rotor winding.

Alternators for vehicle use that mount electrical components such as brush holders, bridge rectifiers and voltage regulators on an outer wall of the slip ring end frame are also known. To protect these electrical components from external damage, a cover is provided that can be attached to the slip ring end frame. The cover is commonly formed of plastic material such as a glass filled nylon and is a one-piece molded part.

Currently there are two methods used to attach the protective cover for an alternator. One method includes self-attachment of the cover to the slip ring end frame of an alternating current generator by means of latch arms extending from the cover. The latch arms are molded into the plastic cover. The end frame has a plurality of circumferentially spaced openings that are spaced so as to receive the latch arms of the cover when the cover is attached to the end frame. Each of these openings has an edge that is defined by two intersecting surfaces. One of these surfaces is parallel to the longitudinal axis of the end frame and the other surface is inclined or slanted so that it is at an angle to the longitudinal axis of the end frame.

To assemble the cover to the end frame, the latch arms are pushed into the openings in the end frame and as this occurs the latch arms are forced or sprung radially outwardly. When the latch arms have been fully pushed into the openings, they spring back radially inwardly due to their resilient characteristic. When the latch arms spring back radially inwardly, the slanted surfaces on the latch arms are forced into tight engagement with the slanted surfaces on the end frame. Because of this, an axial force is developed that tends to force end surfaces of the cover into tight engagement with surfaces on the end frame. Further, when the latch arms spring back radially inwardly, the surfaces on the latch arms that are parallel to the longitudinal axis of the cover are forced into tight engagement with the surfaces on the end frame that are parallel to the longitudinal axis of the end frame. Because of this, the cover is radially clamped to the end frame and is prevented from moving radially with respect to the end frame.

For most applications this method works well and the cover remains tightly secured to the end frame and cover rattling does not occur during use throughout the life of the product. However, on extreme vibration applications, such as on a diesel engine, or with applications that must operate for an extended time, the plastic snaps are prone to creep, which leads to a loose cover. The loose cover may create a rattle noise, and if severe enough, may even fall off after wearing the latch/frame interface.

Another method includes using threaded fasteners that are threaded into the end frame or by threaded fasteners that are threaded into nuts. Typically three screws or studs with nuts are used to hold the cover in place. This method overcomes the creep issue, but it also adds material and assembly costs.

Accordingly, a method and apparatus are desired that overcomes the cost issues with using a plurality of threaded fasteners while also offering the same type of long, term snugness on high vibration and extended time applications provided by the plurality of threaded fasteners.

BRIEF SUMMARY OF THE INVENTION

The above discussed and other drawbacks and deficiencies are overcome or alleviated by a cover assembly for one end of a rotating electrical machine. The cover assembly includes a one-piece cover attached to an end frame supporting at least one electrical component to protect said electrical component from external damage, the cover has an end wall and an axially extending side wall, the side wall has an end surface that engages the end frame; a mounting boss is disposed at the end frame; and a single fastener extends through the end surface. A clamp load at the single fastener securely holds the cover relative to the end frame.

In another embodiment, a method to attach a protective cover to a wound-field electrical machine is disclosed. The method includes forming a one-piece cover attached to an end frame supporting at least one electrical component to protect the electrical component from external damage, the cover having an end wall and an axially extending side wall, the side wall having an end surface that engages the end frame; disposing a mounting boss at the end frame; extending a single fastener through the end surface; and securely holding the cover relative to the end frame via a clamp load at the single fastener.

BRIEF DESCRIPTION OF THE DRAWINGS

FIG. 3 is a top plan view of the mounting boss extending from the slip ring end frame of FIG. 2;

FIG. 4 is a partial cross sectional of the cover of FIG. 2 assembled to the slip ring end frame;

FIG. 5 is a partial top plan view of the cover of FIG. 2; and

FIG. 6 is a full cross section view of the cover of FIG. 2 illustrating a mounting aperture in conjunction with a plurality of circumferentially disposed venting apertures.

DESCRIPTION OF THE PREFERRED EMBODIMENT

Figure 1:
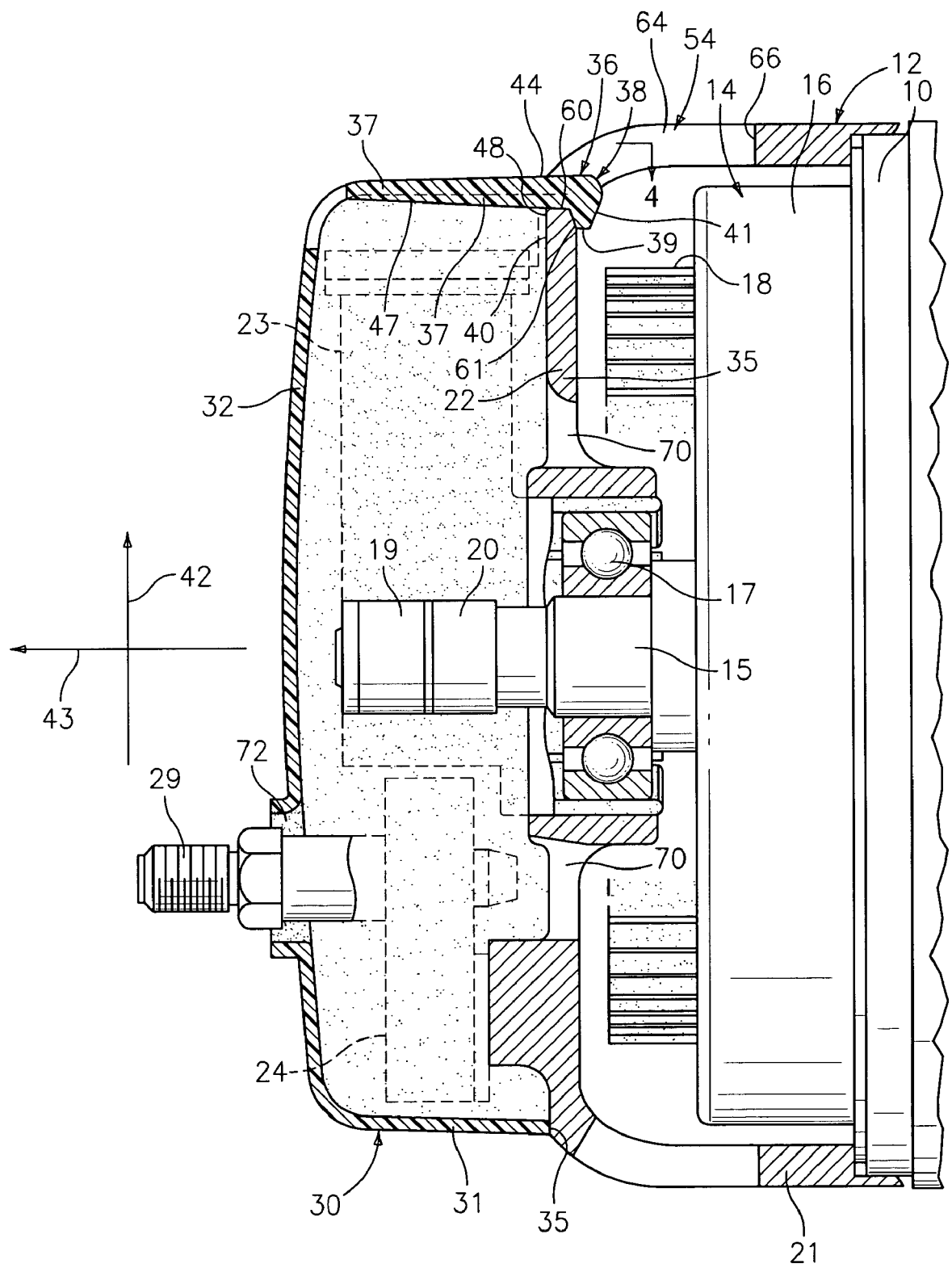
FIG. 1 is a cross sectional view through an alternator illustrating a cover attached to a slip ring end frame of the alternator in accordance with an exemplary embodiment.

Referring now to the drawings, and more particularly to FIG. 1, a cover is shown attached to one end of a dynamoelectric machine. The dynamoelectric machine is an alternating current generator for vehicle use.

The alternating current generator has a stator assembly that is shown diagrammatically in FIG. 1 and designated as 10. This stator assembly, as is well known to those skilled in the art, comprises a slotted stator core. This core supports a three-phase stator winding. The stator assembly is supported by a slip ring end frame 12 and a drive end frame which is not illustrated. The end frame 12 is formed of a metallic material such as die cast aluminum.

The generator has a rotor that is shown partly diagrammatically in FIG. 1 and designated as 14. The rotor 14 has a rotor shaft 15 that carries pole members having interleaved pole teeth, a rotor core and a field coil disposed about the rotor core. The just described parts are not shown in detail but are shown diagrammatically and designated as 16.

One end of rotor shaft 15 is supported for rotation by ball bearing 17 that is supported by end frame 12. The other end of rotor shaft 15 is rotatably supported by a bearing that is supported by the drive end frame of the generator which has not been illustrated. The rotor includes a fan 18 at a slip ring end and may include another fan (not shown at a drive end in a dual internal fan (DIF) configuration. Rotor shaft 15 supports metallic slip rings 19 and 20 that are electrically connected to opposite ends of the rotor field coil by conductors which are not illustrated.

The end frame 12 has an axially extending portion 21 and a radially extending end wall 22. A brush holder 23 is supported by end wall 22 and slidably supports brushes (not illustrated) that respectively engage slip rings 19 and 20. A bridge rectifier 24 that is comprised of two heat sinks, each of which supports three diodes, is supported by end wall 22. The diodes are connected to form a three-phase full wave bridge rectifier. The AC input terminals of the bridge rectifier are connected to the three-phase stator winding. The end wall 22 further supports a voltage regulator (not shown). A direct voltage output terminal or stud 29 has a threaded portion that is threaded into one of the heat sinks of the bridge rectifier. The stud 29 is the positive direct voltage output terminal of the bridge rectifier.

A cover generally designated as 30 is attached to end frame 12 and serves to protect the electrical components such as the brush holder 23, the bridge rectifier 24 and the voltage regulator from external damage. Cover 30 provides an electrical barrier/protection for the exposed connections and lead frame that is roughly at battery voltage. Cover 30 also provides splash and contamination protection for the electrical components.

The cover 30 is formed via an injection molded process using a plastic material such as a 33% glass filled nylon. The cover 30 is a one-piece molded part. However, it is contemplated that cover 30 may be also be fabricated by metal stamping that is coated to accomplish the same task.

The cover 30 has an axially extending wall 31 and a radially extending inclined end wall 32. The wall 31 has an end surface 35 that directly tightly engages outer surface portions of end frame 12 when the cover 30 is attached to the end frame.

The cover 30 optionally includes four circumferentially spaced integral latches that are formed when the cover is molded. Since these latches are identical, only one of the latches, namely latch 36, will be described in detail. The latch 36 has an axially extending rib portion 37 that is joined to a latch arm 38. The latch arm 38, extends axially from end surface 35 of cover wall 31.

The latch arm 38 has a surface 39 that is intersected by inclined or slanted surfaces 40 and 41. The surface 40 is located at an angle of about thirty degrees from a line 42 normal to an axis 43, which is an axis of rotation of shaft 15. Line 42 is perpendicular to the center line or longitudinal axis 43 of cover 30. The surface 41 is located at an angle of about thirty-five degrees from line 42. The latch arm 38 has a laterally extending portion 44 that has opposed side surfaces. The purpose of portion 44, as will be more fully described, is to provide proper angular positioning of cover 30 when it is assembled to end frame 12.

As previously mentioned, the cover 30 optionally includes four latches and one of them, namely latch 36, has been described in detail. The other latch arms are identical to latch arm 38

The end frame 12 has a plurality of circumferentially spaced openings. One of these openings has been designated as 54 in FIG. 1. As will be described in more detail hereinafter, each of the latch arms 38 are respectively inserted into a respective opening 54 when the cover 30 is assembled to frame 12.

Each of the openings 54 have the same general shape so that only one of the openings 54 will be described in detail. The inner edge of opening 54 is defined by a surface 60 that intersects an inclined or slanted surface 61. The surface 61 is located at an angle of thirty degrees to a line 42. The opening 54 is further defined by opposed side surfaces 64 and 65 and another outer surface 66. The other openings 54 all have the same general shape and they all have surfaces that are identical to surfaces 60 and 61 that defines the inner edge of opening 54 illustrated in FIG. 1.

Figure 2:
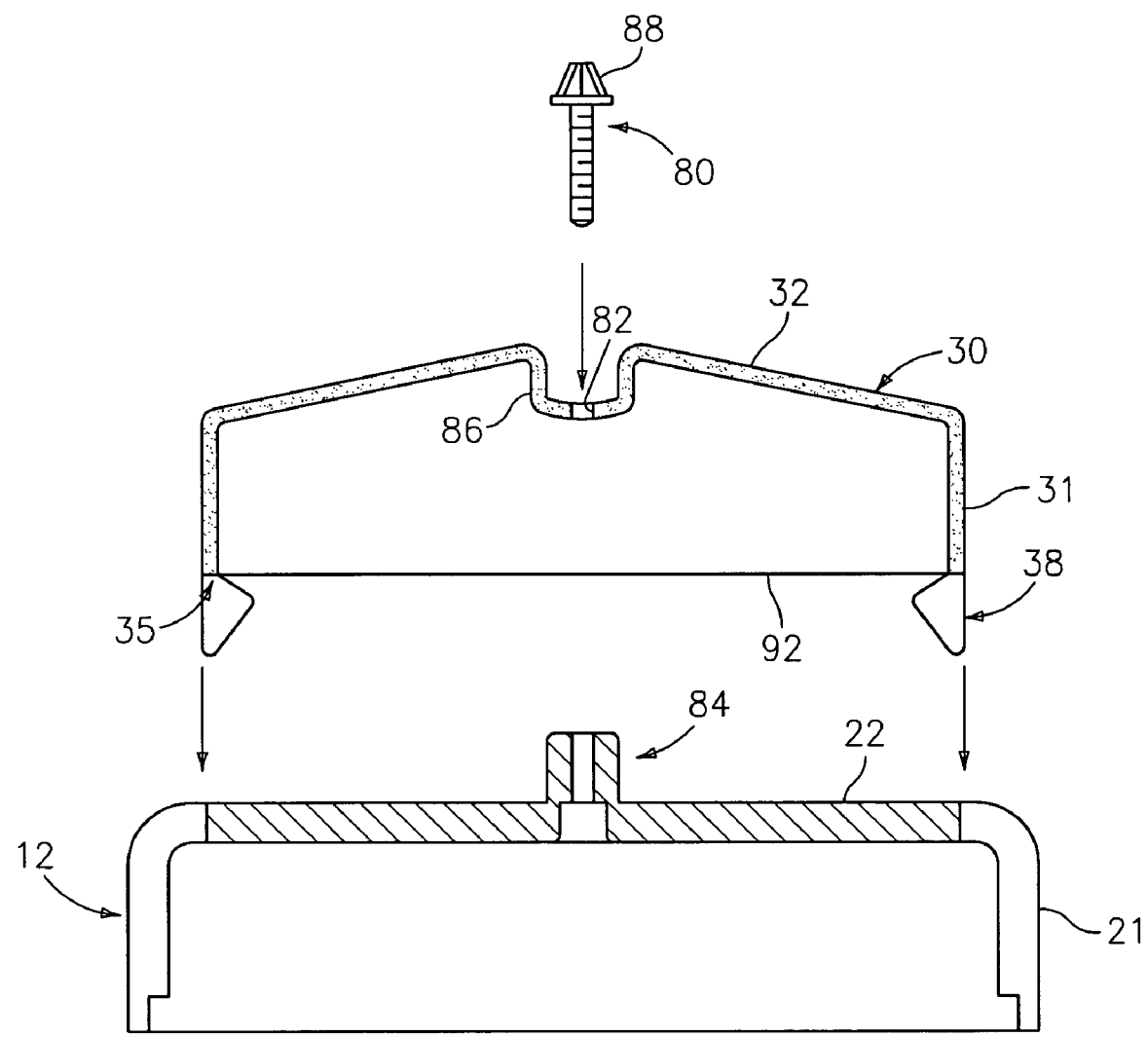
FIG. 2 is cross sectional exploded view of a cover having optional latch arms illustrating a single mounting screw removed from a mounting boss extending from the slip ring end frame in accordance with an exemplary embodiment.

Referring now to FIG. 2, cover 30 of FIG. 1 is schematically illustrated as it is assembled to end frame 12. FIG. 2 depicts a pair of opposing latch arms 38 optionally depending from end surface 35. As discussed above, radially extending inclined end wall 32 extends from an end of axially extending wall 31 having end surface 35 defining an opposite terminal end thereof (unless latch arms 38 are included). The end surface 35 of wall 31 directly tightly engages outer surface portions of end frame 12 when the cover 30 is attached to the end frame 12, thus covering electronics, such as brush holder 22, as best seen with reference to FIGS. 2 and 3. Cover 30 is attached to the end frame 12 using a single fastener 80, such as a threaded bolt or screw.

Screw 80 extends through an aperture 82 configured in radially extending inclined end wall 32 and is aligned with a mounting boss 84 extending from end wall 22 of end frame 12. In an exemplary embodiment, aperture 82 is disposed at a recessed portion 86 of end wall 32 to limit extension of a head 88 of screw 80 from adding to a length of alternator 10, as best seen with reference to FIG. 4.

The screw 80 provides single screw attachment near a center of cover 30 that is threadably fastened to apply a compressive force to end surface 35 defining cover 30 and at the same time carries a weight of the cover 30 itself. The back face of cover 30 defined by radially extending inclined end wall 32 is inclined or mounded as it extends to aperture 82 disposed proximate a center of alternator 10. In an exemplary embodiment, a center of alternator 10 coincides with axis 43 defined by rotatable shaft 15. What is meant by proximate a center of alternator includes a very generous tolerance about the center. In an exemplary embodiment, for example, aperture 82 is disposed about a third of a radial distance between the geometric center corresponding with axis 43 and an outside edge defining a perimeter of end wall 32.

In an exemplary embodiment with reference to FIG. 6, radially extending inclined end wall 32 inclines from side wall 31 toward aperture 82 at an angle 89 of about 2 degrees relative to line 42 normal to center line 43 forming a mounded portion 90. When screw 80 is fastened, the mounded portion 90 of cover 30 is forced to flex toward mounting boss 84 creating a compressive force on a rim 92 of cover 30 defined by axially extending wall 31. Between the compressive force on the rim 92 and the clamp load at the screw 80, the cover is securely held.

However, it will be recognized that it is not necessary that radially extending inclined end wall 32 be inclined in order to provide the compressive force, as even a substantially flat or planar end wall 32 would deflect upon fastening screw 80 to provide a sufficient compressive force on rim 92.

In an alternative embodiment, it will be recognized that it is not necessary that there be a compressive force between the outer rim 92 of the cover 30 and the frame. More specifically, it is envisioned that cover 30 is in a condition where it is just simply held on with one fastening screw 80, without deflection of end wall 32.

Referring to FIGS. 5 and 6, end wall 32 includes a plurality of vent apertures 94 circumferentially spaced allowing airflow therethrough. In an exemplary embodiment, cover 30 having vent apertures 94 is used on a dual internal fan (DIF) alternator for allowing air to be axially drawn into the alternator for cooling components thereof.

The manner in which the cover 30 is assembled to end frame 12 will now be described with cover 30 having optional latch arms 38. In this description, the manner in which latch arm 38 is inserted into opening 54 will be described in detail, it being understood that the other latch arms 38 are inserted into respective openings 54 in the same manner. To assemble cover 30 to frame 12, the latch arms are aligned with respective openings in the frame. In this regard, the side surfaces of portion 44 are angularly positioned such that they can slide into and between frame surfaces defining opening 54. As the cover 30 is pushed or forced toward the end frame, the slanted surface 41 engages the end frame and causes the latch arm 38 to be cammed or forced radially outwardly to a point where eventually the surface 39 of latch arm 38 will engage frame surface 60. As the latch arm 38 continues to be pushed into opening 54, surface 39 will slide along surface 60. As surface 39 leaves surface 60, the latch arm 38 will spring back radially inwardly and the slanted latch arm surface 40 will tightly engage the slanted frame surface 61 as shown in FIG. 1. Further, in the final assembled position of cover 30, the surface portion 48 of latch arm 38 tightly engages frame surface 60 throughout the entire length of frame surface 60.

It will be appreciated that with the cover 30 assembled to end frame 12 in a manner that has been described, the engagement of surfaces 40 and 61 will cause the cover surface 35 to be tightly clamped or forced against surfaces of the end frame 12. The cover is therefore fixed from axial movement relative to the end frame. Attachment of screw 80 with boss 84 further adds to this axial retention of cover 30 with end frame 12.

The engagement of surface 48 of latch arm 38 with frame surface 60 together with engagement of like frame surfaces with like surfaces on latch arms 38 causes the cover 30 to be radially clamped to end frame 12. In this regard, it can been seen from FIGS. 1 and 2 that latch arms 38 will spring back toward each other when the cover 30 is assembled to frame 12. The same is true of the other latch arms 38 not shown. The distance between the center line of frame 12 and a given frame surface, like surface 60, is so related to the distance between the center line of cover 30 and a given latch arm surface like surface 48, that the latch arms in the final assembled position are in a position that is radially outward from the position the latch arms are in prior to assembly of the cover to the frame. Thus, the latch arms have been stressed radially outwardly and they provide a spring-back force due to their resilience to tightly clamp the cover to the frame both axially and radially. Fastening of screw 80 into boss 84 further adds to tightly clamping the cover to the frame both axially and radially.

When the rotor of the alternating current generator is being driven, the fan 18 causes air to be exhausted through openings 54 and other air outlet openings that have not been identified by reference numeral. Air may enter the alternating current generator through a plastic duct in the engine compartment (not illustrated) that is in fluid communication with vent apertures 94 of cover 30. Air passes through the interior of cover 30 and through openings 70 formed in end wall 22 of frame 12. The fan 18 causes the air to flow from openings 70 toward and out of openings like opening 54. The flow of air through cover 30 cools the brush holder, the bridge rectifier and the voltage regulator. One end of the stator winding of the stator assembly is cooled by air flowing toward air outlet openings like opening 54.

It has been pointed out that portions like portion 44 of latch arm 38 provide for proper angular positioning of cover 30 relative to frame 12 when cover 30 is assembled to frame 12. These portions, like portion 44, also prevent the cover 30 from rotating relative to frame 12 once the cover is assembled to the frame.

The cover 30 optionally includes an opening 72 and a stud 29 projecting through this opening.

The above described cover assembly overcomes the cost issues associated with using a plurality of threaded fasteners by limiting the required fasteners to a single fastener, but at the same time, offers the same type of long term snugness on high vibration and extended applications.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A cover assembly for one end of a rotating electrical machine comprising:

a one-piece cover attached to an end frame supporting at least one electrical component to protect said electrical component from external damage, said cover having an end wall and an axially extending side wall, said side wall having an end surface that engages said end frame;

a mounting boss disposed at said end frame; and a single fastener extending through said end wall, wherein fastening said single fastener with said mounting boss creates a clamp load at said single fastener and further causes said end wall to flex toward said mounting boss creating a compressive force on said end surface of said cover, said clamp load at said single fastener and said compressive force on said end surface securely holds said cover relative to said end frame.

2. The cover assembly of claim 1, wherein said mounting boss is disposed proximate an axial center of said end frame.

3. The cover assembly of claim 1, wherein said cover includes a plurality of circumferentially spaced and axially extending latch arms that respectively project into openings in said end frame.

4. The cover assembly of claim 3, wherein each said latch arm includes a first latch arm surface and a second slanted latch arm surface that intersects said first latch arm surface, said second slanted latch arm surface located at an angle to said first latch arm surface, said second slanted latch arm surfaces respectively directly engaging said second slanted frame surfaces to cause said end surface of said side wall to tightly engage said end frame and to prevent said cover from moving axially with respect to said end frame, said first latch arm surfaces respectively directly engaging said first frame surfaces to radially clamp said cover to said end frame to thereby prevent said cover from moving radially with respect to said end frame.

5. The cover assembly of claim 3, wherein said openings in said end frame provide air passages for cooling air.

6. The cover assembly of claim 3, wherein said openings in said end frame provide air passages for permitting a flow of cooling air therethrough.

7. The cover assembly of claim 1, wherein said end wall inclines towards a center defining said end wall and away from said mounting boss.

8. The cover assembly of claim 7, wherein said incline is about a 2 degree incline relative to a line normal to a rotating axis of the rotating electrical machine.

9. The cover assembly of claim 1, wherein the rotating electrical machine is an alternating current generator for vehicle use.

10. The cover assembly of claim 1, wherein said one-piece cover is formed of one a plastic injection molded process and metal stamping.

\* \* \* \* \*